(12) United States Patent
Pochapsky

(10) Patent No.: US 7,961,381 B2
(45) Date of Patent: Jun. 14, 2011

(54) COMBINED DAY AND NIGHT WEAPON SIGHT

(75) Inventor: Eugene Pochapsky, Cheswick, PA (US)

(73) Assignee: Omnitech Partners, Freeport, PA (US)

( * ) Notice: Subject to any disclaimer, the term of this patent is extended or adjusted under 35 U.S.C. 154(b) by 84 days.

(21) Appl. No.: 12/383,856

(22) Filed: Mar. 26, 2009

(65) Prior Publication Data

US 2010/0103508 A1 Apr. 29, 2010

Related U.S. Application Data

(63) Continuation of application No. 11/165,654, filed on Jun. 24, 2005, now abandoned.

(51) Int. Cl.
*G02B 23/12* (2006.01)
(52) U.S. Cl. ............. 359/353; 359/399; 42/111; 42/119
(58) Field of Classification Search .................. None
See application file for complete search history.

(56) References Cited

U.S. PATENT DOCUMENTS

| | | | |
|---|---|---|---|
| 3,194,108 A | 7/1965 | Gunther | |
| 4,822,994 A | 4/1989 | Johnson et al. | |
| 4,961,278 A | 10/1990 | Johnson et al. | |
| 5,084,780 A | 1/1992 | Phillips | |
| 5,282,082 A | 1/1994 | Espie et al. | |
| 5,373,320 A | 12/1994 | Johnson et al. | |
| 5,497,266 A | 3/1996 | Owen | |
| 5,867,915 A | 2/1999 | McMillan | |
| 5,880,878 A | 3/1999 | Shin | |
| 5,898,519 A | 4/1999 | Palmer | |
| 5,946,132 A | 8/1999 | Phillips | |
| 6,131,294 A | 10/2000 | Jibiki | |
| 6,204,961 B1 | 3/2001 | Anderson et al. | |
| 6,608,298 B2 | 8/2003 | Gaber | |
| 6,624,414 B1 | 9/2003 | Glesener | |
| 6,724,131 B2 | 4/2004 | Iosue | |
| 6,747,258 B2 | 6/2004 | Benz et al. | |
| 6,765,352 B2 | 7/2004 | Ohtomo et al. | |
| 2003/0102431 A1* | 6/2003 | Gaber ........................... | 250/330 |

FOREIGN PATENT DOCUMENTS

DE 4016587 A1 * 11/1990

OTHER PUBLICATIONS

International Search Report issued in related International Patent Application No. PCT/US06/22867.
Written Opinion of the International Searching Authority issued in related International Patent Application No. PCT/US06/22867.
Office Action issued by the U.S. Patent and Trademark Office on Jun. 22, 2007 in connection with U.S. Appl. No. 11/165,654.
Office Action issued by the U.S. Patent and Trademark Office on Oct. 22, 2007 in connection with U.S. Appl. No. 11/165,654.
Office Action issued by the U.S. Patent and Trademark Office on Jul. 2, 2008 in connection with U.S. Appl. No. 11/165,654.
Office Action issued by the U.S. Patent and Trademark Office on Nov. 26, 2008 in connection with U.S. Appl. No. 11/165,654.

* cited by examiner

*Primary Examiner* — Arnel C Lavarias

(57) ABSTRACT

A combination day/night sight includes an image intensifying sensor/display combination and a daytime optical path length compensator that may be selectively placed within the optical path. Use of the optical path length compensator when the image intensifying sensor/display is not being used eliminates the need for moving optical elements. The night sight therefore requires no change in focus or bore sight adjustment after switching between day and night operations.

22 Claims, 4 Drawing Sheets

COMBINED DAY AND NIGHT WEAPON SIGHT

CROSS REFERENCE TO RELATED APPLICATION

This application is a continuation of prior application Ser. No. 11/165,654 filed on Jun. 24, 2005 now abandoned, and which is incorporated herein by reference.

BACKGROUND OF THE INVENTION

1. Field of the Invention

The present invention relates to night vision devices. More specifically, the present invention provides a combined day and night sight capable of providing an intensified and potentially magnified sight picture at night or under poor viewing conditions, and a potentially magnified sight picture in more favorable light and viewing conditions.

2. Description of the Related Art

The use of a light source to illuminate the target—whether visible light or infrared—has the disadvantage of indicating the location of the shooter. Laser aiming devices carry the same disadvantage. Thermal infrared imaging, which does not require a light source, has the disadvantage of producing an unnatural image. Light gathering and intensifying night vision devices produce natural images, but are only useful to the extent that there is available light to gather and intensify. The use of tritium illuminated sights, while making the sights more visible, fails to illuminate the target even if the tritium-illuminated aiming reticle is within a telescopic sight providing light gathering and magnification. Additionally, both night vision equipment and daytime telescopic sight add weight and bulk to the weapons with which they are used.

A typical night vision sight utilizes an objective lens having a maximized size for maximum light gathering capability. After passing through the objective lens, light passes through a focusing assembly that is used to vary the distance light travels between lenses within the sight by moving either a focal length adjust lens with respect to the objective lens, or a mirror within the night vision device along an axis to change the length of the light path. The light will therefore be brought into sharp focus on the photosensitive surface of the image intensifier.

A photocathode having an electrical current flowing therethrough which forms the photosensitive surface of the image intensifier converts the optical image into an electronic image that is transmitted through an electron flow. The electrons are accelerated through the image intensifier, and remain focused because of the close proximity of surfaces within the image intensifier tube. Acceleration of the electrons, combined with a microchannel electron-multiplying plate, result in intensification of the original image. When the electrons reach a screen, the electronic image is converted to an optical image. The final, amplified visible image is displayed to the shooter or to other optical devices within the night sight.

The output image of the image intensifier may be presented to a collimator. The collimator presents the image to the shooter in a manner so that it appears to originate from a long distance. The orientation of the collimator affects the degree to which the image transmitted by the collimator appears to originate from the same angle at which it entered the objective lens.

Some night sights attempt to combine a daytime telescopic scope and a night sight into the same sight. Many of these devices use two optical paths, one used during the day, and one for use at night. In addition to making the sight unnecessarily heavy, the use of two optical paths creates a likelihood of differences between point of aim and point of impact from one optical path to the other.

Other night vision devices utilize a removable image intensifier tube to permit use of the night sight as a day sight. However, image intensifier tubes are delicate instruments, subject to damage when removed. Furthermore, a temperature difference between the image intensifier and the scope upon insertion of the image intensifier may cause fogging of the sight.

Other night vision sights utilize an image intensifier moved within the housing from a position within the sight's light path to a position outside the sight's light path depending on whether the sight is being used during the day or at night. Such systems may also require the movement of the objective lens and the eye piece lens assembly in conjunction with the image intensifier tube so that the daytime optics move outward as the image intensifier tube is moved therebetween, thereby maintaining the proper focal distance for the daytime optics. Such movement of both the daytime optics and the image intensifier tube raises the issue of the repeatability of these movements.

Accordingly, there is a need for a combined day and night sight forming a single compact, lightweight package that minimizes the bulk and weight that the user must deal with. There is a further need for a combination day/night sight having no moving optical elements, no moving mirrors, and no compromise of the environmental seal. There is an additional need for a night sight wherein any beam splitters are not critical to the operation of the sight itself, but are used for unrelated functions such as optical designating, detection, communications, or ranging functions.

SUMMARY OF THE INVENTION

The present invention provides a combination day and night observation device that is particularly suited for use as a sight for a firearm, but which may also be used for observation. The invention includes an image intensifying sensor/display combination and a daytime optical path length compensator having substantially the same optical path length as the image intensifying sensor/display combination. For the purpose of this description, two day/night sight components have substantially the same optical path if the substitution of one component for the other does not require a change in either the focus or the bore sight of the weapon upon which the sight is mounted for shooting at typical shooting distances. Either the image intensifying sensor/display or the daytime optical path length compensator may be placed within the optical path defined within the sight, depending on whether the sight is used in good or poor viewing or lighting conditions. The use of the optical path length compensator eliminates the need for moving optical elements to compensate for the change in the optical pathway when the image intensifying sensor/display is moved outside of the optical path for daytime use.

The front of the combination day/night sight includes an objective lens that may be a coaxial objective lens having a central portion structured to transmit visible light, and an annular portion structured to transmit infrared light or other wavelengths. An optional beam splitter may be located behind the objective lens for splitting out wavelengths other than visible light and directing them towards an optional electro-optical module that may be used for thermal infrared imaging, target designation, communication, or ranging functions. Alternatively, regardless of whether a coaxial objective lens is used, the beam splitter may be used to divert a duplicate visual image to an electro-optical module structured to permit another individual to view the image seen by the user of the day/night sight.

The image intensifying sensor/display combination and the daytime optical path length compensator are secured within a reciprocating slider secured within the housing of the day/night sight, behind the objective lens and behind the optional beam splitter. The slider is structured to selectively position either the image intensifying sensor/display or the optical path length compensator behind the objective lens, within the optical path defined within the day/night sight. This may be accomplished by a slider that slides back and forth between a daytime position and a night position, or a slider that pivots about an axis to move between a day position and a night position. The axis about which the slider rotates may be either substantially perpendicular or substantially parallel to the optical path defined within the night sight.

An image erector may be disposed behind the slider, ensuring that the image is oriented right side up before the image is presented to the reticle, located directly behind the image erector. The reticle may be formed from etched glass, wire, deposited metal, or a holographic projected design such as those used within a commonly available red dot sight.

Accordingly, it is an object of the present invention to provide a combination day/night sight wherein either an image intensifying sensor/display or an optical path length compensator may be placed within the optical path.

It is another object of the invention to provide a combination day/night sight that is more compact, lighter weight, and exhibits better performance than existing combination day/night sights.

It is a further object of the invention to provide a combination day/night sight without the need for moving optical elements to accommodate changes in optical path length when switching from day to night usage, no necessary moving mirrors, no necessary beam splitters, and no compromise of the environmental seal.

It is another object of the invention to provide a combination day/night sight that presents a magnified image to the user.

It is a further object of the invention to provide a combination day/night sight that maintains the night vision channel f/number (focal length/diameter) throughout the full zoom range.

It is another object of the invention to provide a combination day/night sight requiring no change in focus or bore sight adjustment after switching between day and night operation.

It is a further object of the invention to provide a combination day/night sight providing for integration with optical designating, detection, communication, or ranging functions within the same objective lens assembly.

These and other objects of the invention will become more apparent through the following description and drawings.

BRIEF DESCRIPTION OF THE DRAWINGS

Like reference characters denote like elements throughout the drawings.

DETAILED DESCRIPTION OF THE PREFERRED EMBODIMENTS

Figure 1:
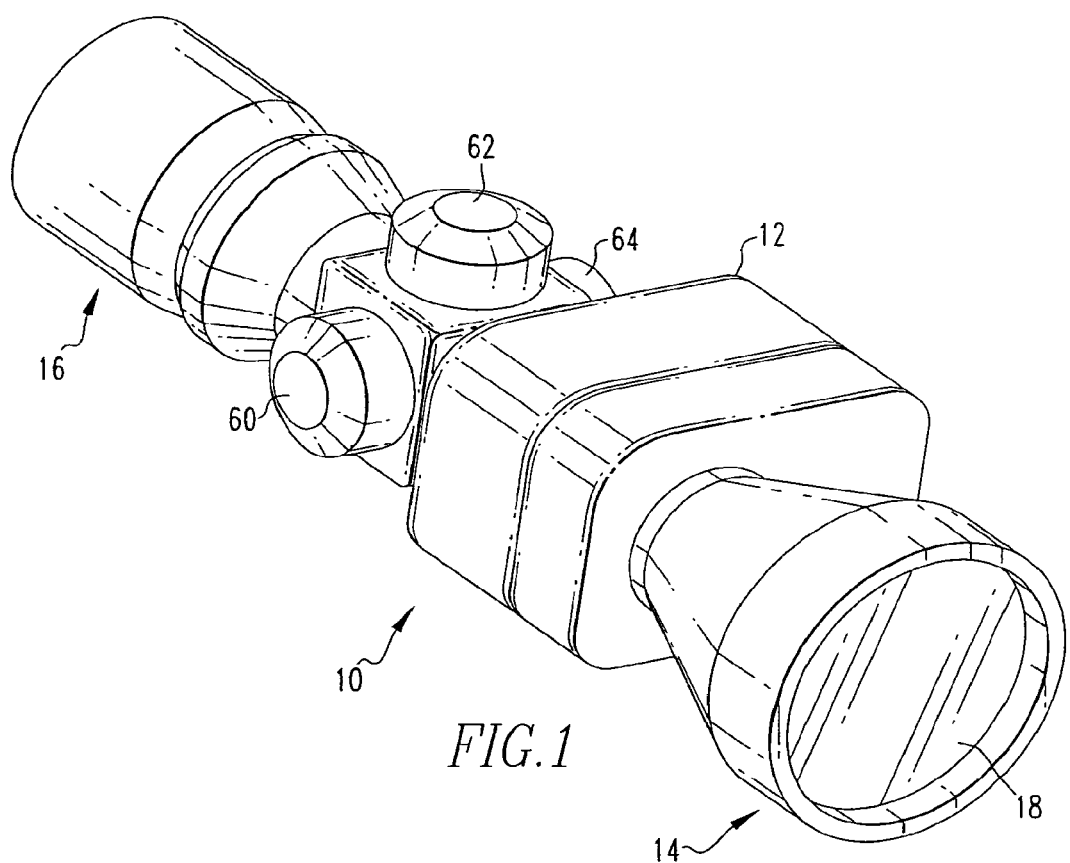
FIG. 1 is an isometric front, side, and top view of a combination day/night sight according to the present invention.
Figure 2:
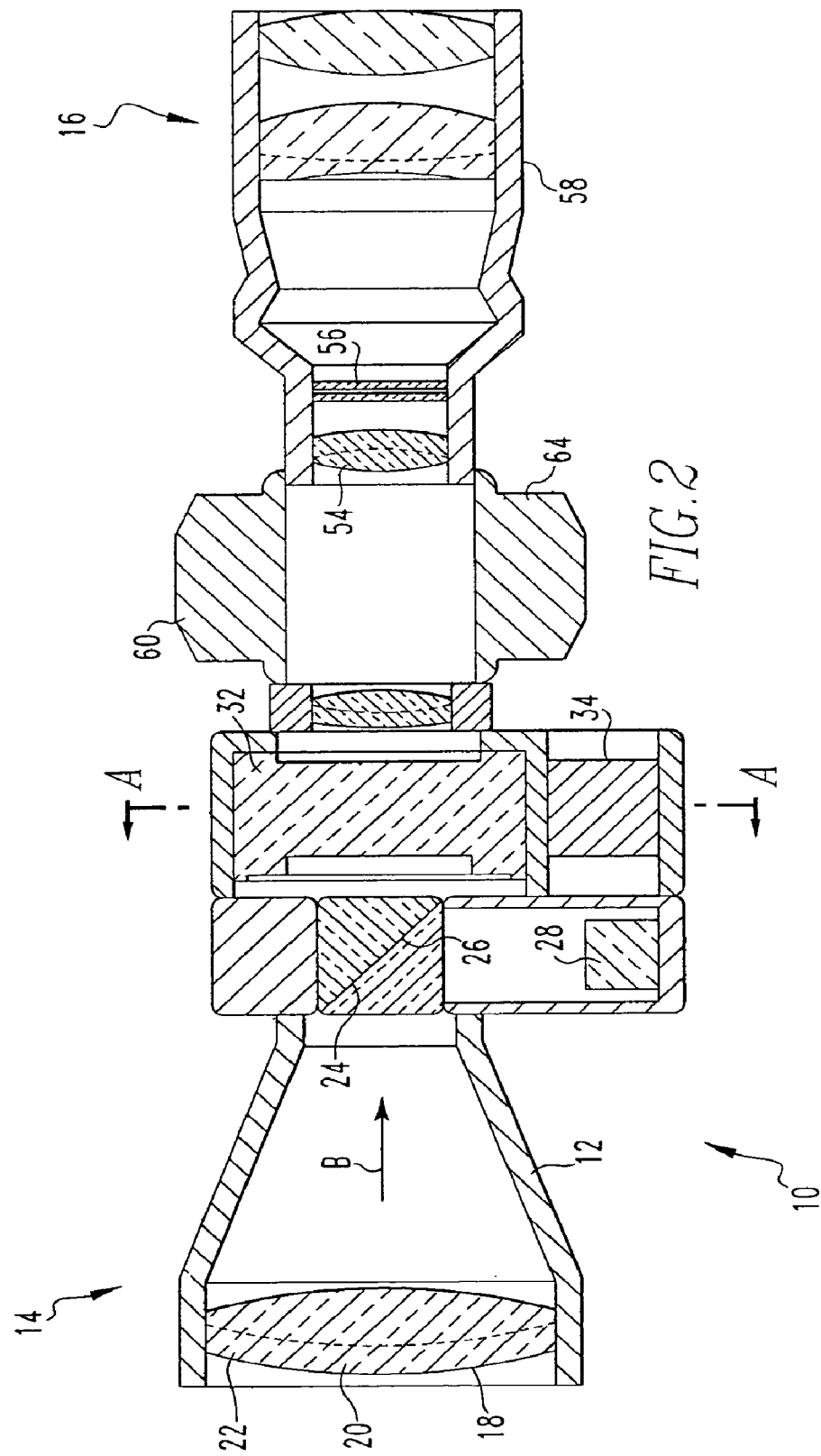
FIG. 2 is a side cross-sectional view of a combination day/night sight according to the present invention.

The present invention provides a night vision device intended to serve as a combination day and night sight for a firearm, although it can also be used for observation. The combination day and night sight 10 is illustrated in FIGS. 1-2. The sight 10 includes a housing 12 having a forward end 14 and a rearward end 16.

An objective lens 18 is housed within the forward end 14. In some embodiments, the objective lens 18 may be a coaxial objective lens having a central portion 20 structured to transmit visible light, and an annular portion 22 structured to transmit infrared light or other wavelengths. Alternatively, the objective lens 18 may have a cutaway section as disclosed in U.S. patent application Ser. No. 11/011,671, filed Dec. 14, 2004.

An optional beam splitter 24 may optionally be disposed behind the objective lens 18. The beam splitter 24 includes a dichroic surface 26 structured to transmit light of certain wavelengths, for example the visible spectrum, and reflect light having other wavelengths, for example, infrared. The beam splitter 24 may be made from two mating components of a cube of glass or other material that is transparent in the wavelength ranges of interest, with the mating surfaces forming an angle of about 45° upon which a dichroic coating is applied. A plate or pellicle beamsplitter may also be used. Preferred dichroic coatings include thin film dielectric, ion beam assisted deposition hard dielectric, chemical vapor deposition (CVD) coatings and rugate filters. Preferred beam splitter materials include optical glass, Zinc Sulphide, Zinc Selenide, Sapphire, Fused Silica, Calcium Fluoride, Magnesium Fluoride, Sodium Chloride, Cesium Bromide, Cesium Iodide, Lithium Fluoride, Potassium Bromide, and Thallium Bromoiodide.

An optional electro-optical module 28 may be disposed adjacent to the beam splitter 24, preferably in a direction substantially perpendicular to the optical path, designated by the arrow B. The electro-optical module 28 may, for example, be a device such as an infrared camera for presenting a near infrared or thermal image to a user, or a visible light camera structured to transmit a duplicate of the image viewed by the user to a second user. Other examples of electro-optical modules include SWIR image sensors, lead salt IR image sensors, uncooled or cooled IR image sensors, receivers and/or transmitters for diode or laser diode illumination and/or laser rangefinding or remote communications, transmitters for optical target designation, UV image sensors, CCD or CMOS image sensors, intensified CCD or CMOS image sensors, electron multiplying CCD or CMOS sensors, and visible or intensified image sensors.

Figure 3:
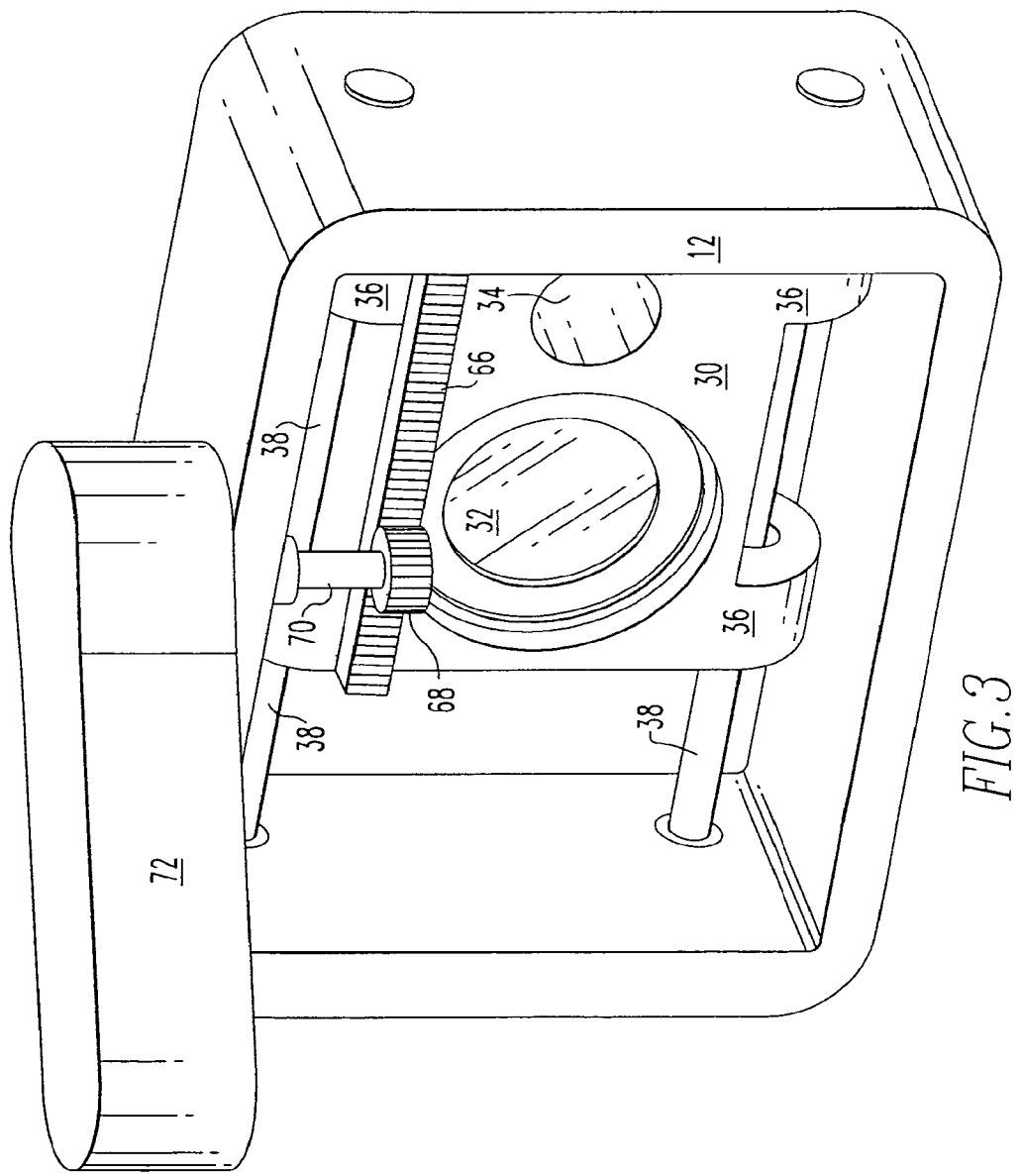
FIG. 3 is a rear isometric cutaway view of a night sight according to the present invention, taken along the lines A-A in FIG. 2, showing the night configuration.
Figure 4:
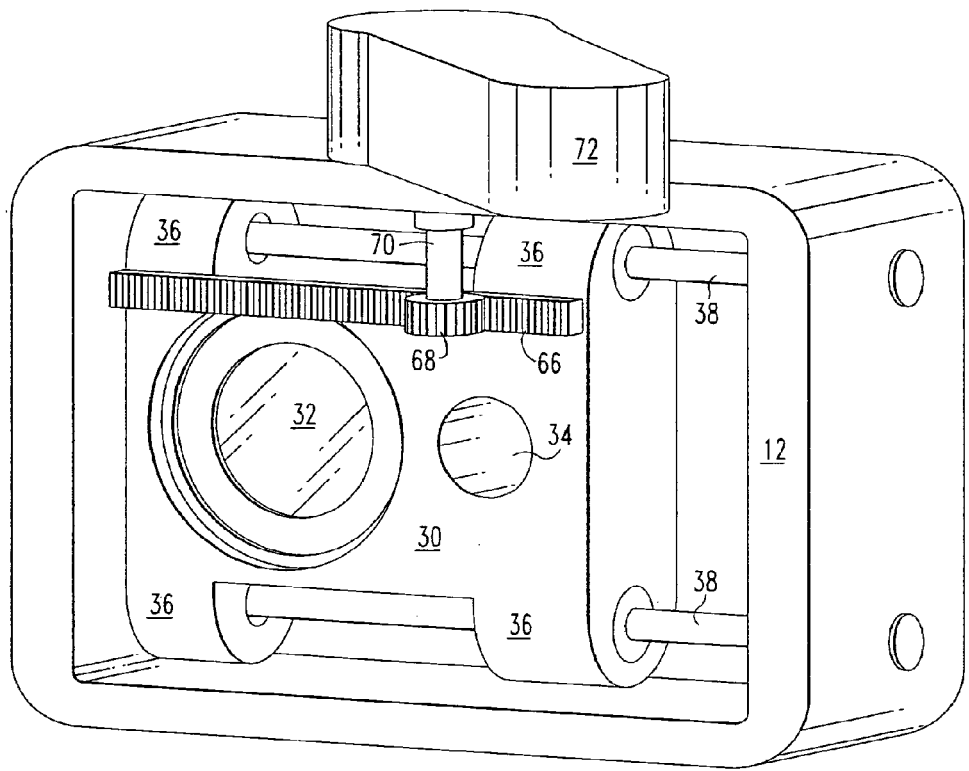
FIG. 4 is a rear isometric cutaway view of a combination day/night sight according to the present invention, taken along the lines A-A in FIG. 2, showing the daytime configuration.

Referring to FIGS. 2-4, a slider 30 housing an image intensifying sensor/display combination 32 and a daytime optical path length compensator 34 is disposed along the optical path B behind the objective lens 18, and in the illustrated example behind the beam splitter 24. Although only two alternative optical devices are shown in the illustrated example, more than two devices may be used. For example, a slider having three optical devices may provide the options of visible light intensification, thermal infrared, and optical path length compensation. One preferred slider 30 includes slide rails 36 structured to guide the slider 30 along the guide rails 38. Such a slider 30 slides laterally between the night time position of FIG. 3, wherein the image intensifying sensor/display 32 is within the optical path, and the daytime position of FIG. 4, wherein a daytime optical path length compensator 34 is within the optical path. The illustrated embodiment of the slider 30 includes a row of teeth 66 substantially parallel to the guide rails 38. The row of teeth 66 is structured to mesh with a gear 68 at the end of a shaft 70 that is rotatably secured within the housing 12. The opposite end of the shaft 70 is secured to a handle 72 disposed outside the housing 12. By rotating the handle 72, a user may cause the slider to move between the nighttime position of FIG. 3 and the daytime position of FIG. 4. Other embodiments of a slider 30 may be structured to pivot about an axis to move either the image intensifying sensor/display 32 or the optical path length compensator 34 into the optical path. Such a slider 30 preferably rotates around an axis that is either substantially parallel to or substantially perpendicular to the optical path B.

Any of several presently available image intensifying sensor/display combinations 32 may be used with a combination day/night sight 10. Examples include a glass-input, glass-output generation 2 or generation 3 filmed or unfilmed image intensifier with planar input and output surfaces, a glass-input, fiber-output generation 2 or generation 3 filmed or unfilmed image intensifier with planar input and output surfaces, or a fiber-input, fiber-output generation 2 or generation 3 filmed or unfilmed image intensifier with planar input and output surfaces. A glass-input glass-output generation 2 image intensifier, or a generation 3 fiber-output image intensifier, is particularly well suited to the combination day/night sight 10, having unity magnification, zero image shift, and the same optical characteristics as a glass plate having planar input and output surfaces and having substantially the same refractive index and thickness. Such an image intensifier 32 can then be used in conjunction with an optical path length compensator 34 made from a glass plate having the same thickness and planar input and output surfaces as the image intensifier. Alternatively, a glass plate having a different thickness and refractive index may be used, as long as the combination of glass and air space results in substantially the same optical path length as the image intensifier 32.

The structure and functioning of an image intensifier 32 or other similar devices is well-known, and therefore only briefly described herein. In the most preferred embodiments of an image intensifier, a photocathode having an electrical current flowing therethrough which forms the photosensitive surface of the image intensifier converts the optical image into an electronic image that is transmitted through an electron flow. The electrons are accelerated through the image intensifier, and remain focused because of the close proximity of surfaces within the image intensifier tube. Acceleration of the electrons, combined with a microchannel electron-multiplying plate, result in intensification of the original image. When the electrons reach a screen, the electronic image is converted to an optical image.

Other sensors that may be used as part of an image intensifying sensor-display combination include uncooled detector arrays, lead salt detector arrays, short wave infrared detector arrays, visible band charge coupled display (CCD) arrays, and intensified electron-multiplying CCD or CMOS arrays having direct, fiber, or optical coupling. Some displays that may be used with any of these sensors include an inverting fiber optic output display, an LCD display, a micro mirror array, a CRT, a plasma display, or an OLED display.

Regardless of the type of image intensifying sensor/display combination selected, having the sensor and display physically connected to each other ensures that any shift in the sensor results in a corresponding shift in the display. The sensor/display combination is therefore insensitive to shifts of the sensor/display combination in any direction substantially perpendicular to the optical path B.

In some embodiments, a thin elastomer surrounds the image intensifier 32. The elastomer permits the image intensifier 32 to be tightly secured within the slider 30, thereby resisting movement of the image intensifier 32 resulting from shock or temperature change, while also distributing the high mounting forces over the entire surface of the image intensifier 32, thereby resisting deformation of the image intensifier 32 over time from these high forces. The elastomer further provides a degree of shock absorbance, thereby protecting the shock sensitive equipment within the image intensifier 32. Additionally, the elastomeric suspension of the image intensifier 32 within the slider 30 compensates for different coefficients of thermal expansion within the material used for the image intensifier 32 and slider 30, retaining the image intensifier 32 in its desired position despite expansion and contraction of the components.

A variety of elastomers can be used to suspend the image intensifier 32 within the slider 30. Some examples include polysulfide, one-part or two-part liquid or paste silicones, epoxies, ethylene propylene diene rubber (EPDN), acrylonitrile-butadiene rubber (NBR), hydrogenated acrylonitrile-butadiene rubber (HNBR), chlorobutadiene rubber (CR), carboxylated nitrile rubber (XNBR), acrylate rubber (ACM), ethylene acrylic rubber (AEM), methyl polysiloxane (MQ), vinyl-methyl polysiloxane (VMQ), phenyl-vinyl-methyl polyiloxane (PVMQ), phenyl-methyl polysiloxane (PMQ), fluoromethyl polysiloxane (FVMQ), fluoro elastomer (FKM), perfluoro elastomer (FFKM), polyester-urethane rubber (AU), polyether-urethane rubber (EU), ethylene-oxide-epichlorhydrin rubber (ECO), polyepichlorohydrine (CO), chlorosulphonated polyethylene (CSM), natural rubber (NR), isoprene rubber (IR), polybutadiene rubber (BR), styrene-butadiene rubber (SBR), ethylene propylene copolymer (EPM), butyl rubber (IIR), chlorobutyl rubber (CIIR), and brominebutyl rubber (BIIR).

Figure 5:
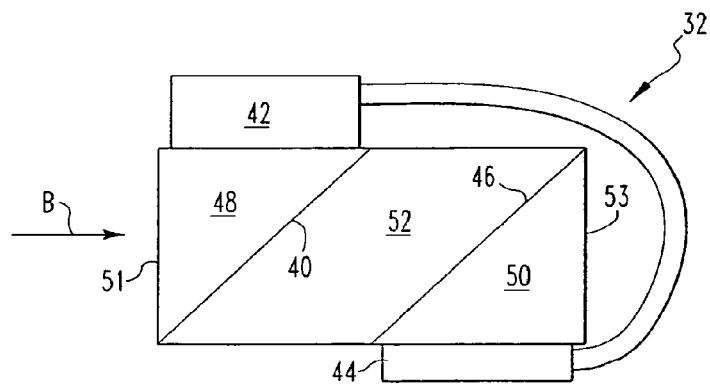
FIG. 5 is a side view of one embodiment of an image intensifying sensor/display combination for a combination day/night sight according to the present invention.

Referring to FIG. 5, one possible arrangement of a sensor/display combination is illustrated. Sensor/display combination 32 of FIG. 5 includes a forward mirror 40 structured to reflect an image from the optical path to a sensor 42. The sensor 42 is structured to display the image on a display 44. A rear mirror 46 is structured to reflect the image displayed on a display 44 back along the optical path. The forward mirror 40 and rearward mirror 46 are preferably formed by depositing a reflective coating along the mating halves of a diagonally split block of an optical material transmitting in the wavelength range of interest having a forward section 48 and rearward section 50. The characteristics of the optical path length compensator 34 are determined by the spacing between the sensor 42 and the forward mirror 40, the forward 40 and the rearward mirror 46, and the rearward mirror 46 and the display 44. In the preferred configuration, the optical path length compensator can be the airspace that remains when the sensor/display combination 32 is removed from the optical path in the daytime position. A rhombus 52 may be placed between the forward mirror 40 and rearward mirror 46 to provide for proper spacing between the forward mirror 40 and the objective lens 18, and between a rearward mirror 46 and optical devices located behind the sensor/display combination 32. The use of a rhombus 52 ensures that the input surface 51 and output surface 53 of the sensor/display combination 32 remain substantially perpendicular to the optional path B regardless of the size of the rhombus 52 and maintains a fixed orientation between the sensor 42 and display 44 so that displayed image location is insensitive to shifts in the sensor/display combination orthogonal to the optical path. Likewise, accurate positioning of the slider 30, and of the image intensifier 32 and optical path length compensator 34 within the slider, are not required to maintain boresight The forward mirror 40 and/or the rearward mirror 46 may be formed directly on the faces of the rhombus 52, in which case the forward section 48 or rearward section 50 may be removed and replaced with air.

An image erector 54 is disposed behind the slider 30, along the optical path B. Because the image was inverted when it passed through the objective lens 18, it is necessary to ensure that it is presented right side up to the user, regardless of whether the image intensifying sensor/display 32 or the optical path length compensator 34 is within the optical path. While some image intensifying sensor/display combinations in other night sights may use an inverting display, an inverting display within the image intensifying combination 32 is inappropriate because the optical path length compensator does not invert the image. By ensuring that the image is inverted only when passing through the objective lens 18 and then when passing through the image erector 54, the image will always be presented to the user right side up regardless of whether the image intensifying sensor/display 32 or optical path length compensator 34 is within the optical path B.

An aiming reticle 56 may disposed along the optical path B, behind the image erector 54. Any presently available aiming reticle may be used within the night sight 10, for example, etched glass, wire, deposited metal, or a holographic projected design such as those used within a commonly available red dot sight. Alternatively, the aiming reticle 56 may be omitted if the purpose of the device is observation instead of aiming.

An eyepiece 58 is disposed at the rearward end 16 of the housing 12. The eyepiece 58 may be selected to provide any desired magnification, including unity magnification, or a fixed magnification of a desired power level. Alternatively, a presently available zoom eyepiece may be used as the eyepiece 58. Zoom eyepieces are known to those skilled in the art of optics, and therefore not described further herein.

The night sight 10 preferably includes an elevation adjustment mechanism, a windage adjustment mechanism, and a focus adjustment mechanism. Windage and elevation adjustment is accomplished by a mechanical linkage between the knobs 60, 62 and the reticle 56, whereby turning the knob 60 raises or lowers the reticle 56 with respect to the image, and turning the knob 62 moves the reticle 56 right or left with respect to the image. Such windage and elevation aiming adjustment mechanisms are well known to those skilled in the art of optical firearm sights, and are therefore not described further herein. Likewise, the focus adjustment knob 64 is connected by a well known mechanical linkage to a means for sliding one or more objective lens elements 18 substantially parallel to the optical path B of the sight 10. Such focusing mechanisms are well known to those skilled in the art of telescopic weapon sights, and are therefore not further described herein.

In use, the sight 10 will be mounted onto the top of the barrel or receiver of a weapon in a manner well-known to those skilled in the art. If the sight 10 is being used during daytime, the user will position the optical path length compensator 34 along the optical path. Conversely, if the sight 10 is being used at night or under conditions where the image intensifying sensor/display will be useful, the user will position the image intensifying sensor/display combination 32 along the optical path. The user will then adjust the focus knob 64 until the user is viewing a sharp, clear image. Light passing through the objective lens 18 will reach the beam splitter 24, regardless of whether such light is focused by the central portion 20 of a coaxial objective lens 18, or the annular portion 22 of a coaxial objective lens 18. A portion of the light reaching the reflective surface 26 of the beam splitter 24, for example, all visible light, will pass through the reflective surface 26, and then through either the image intensifying sensor/display combination 32 or the optical path length compensator 34. The image will be inverted by the image erector 54 to compensate for the original image inversion that occurred when the image passed through the objective lens 18. The user will view the image through the eyepiece 58, with the aiming reticle 56 displayed over the image 54. If the user determines through shooting the weapon that the sight 10 is not properly sighted in, the user may adjust the position of the reticle 56 as appropriate using the knobs 60, 62.

If a beam splitter 24 and electro-optical module 28 are included, a portion of the light passing through the objective lens, for example, infrared light passing through the annular portion 22, will be reflected off of the reflected surface and directed towards the electro-optical module 28. Some embodiments of the electro-optical module 28 may be an infrared camera structured to produce a thermal image based on the infrared light. This thermal image may then be displayed to the user, or to another user. Alternatively, a portion of visible light striking the beam splitter 24 may be directed to another embodiment of the electro-optical module 28, which may be a visible light camera for displaying the image seen by the user to another user. As another alternative, the beam splitter 24 and electro-optical module 28 may be placed at other locations within the night sight 10. For example, if the electro-optical module 28 is a visible light camera and it is desired that a second user observe the same image as the first user, then the beam splitter 24 and electro-optical module 28 may be positioned behind the slider 30, the reticle 56, or the zoom eyepiece 58.

The present invention therefore provides a combination day/night sight wherein either an image intensifying sensor/display or an optical path length compensator may be placed within the optical path. Other embodiments of the invention may selectively place other optical devices in the optical path, for example, thermal infrared imagine cameras and displays. The combination day/night sight is more compact, lighter in weight, and exhibits better performance than existing combination day/night sights. The combination day/night sight does not require any moving optical elements to compensate for moving the image intensifier 32 out of the optical path B, no necessary moving mirrors, no necessary beam splitters, and no compromise of its environmental seal. The sight presents the image to the user at any desired magnification, which may be either fixed or variable. The sight maintains the night vision channel f/number throughout the full zoom range, thereby maintaining the desired brightness. Because the image intensifying sensor/display and optical path length compensator have substantially the same optical path length, either may be placed within the optical path without any change in focus or bore sight adjustment. The boresight is insensitive to the lateral or vertical position of the optical path length compensator and the image intensifying sensor/display. Some embodiments of the invention may provide for the integration of optical designating, detection, communication, or ranging functions within the same objective lens assembly through the use of an optional beam splitter and electro-optical module.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A night vision device, comprising:
    an optical path defined within the night vision device;
    an image intensifying sensor/display combination having an optical path length;
    a daytime optical path length compensator having an optical path length substantially the same as the optical path length of the image intensifying sensor/display combination, the compensator comprising a glass plate having planar input and output surfaces;
    a slider including both the image intensifying sensor/display combination and the daytime optical path length compensator, the slider being structured to selectively reciprocate between a day position and a night position, the daytime optical path length compensator being positioned within the optical path in the day position, the image intensifying sensor/display combination being positioned within the optical path in the night position, and wherein the slider slides laterally between the day position and the night position; and
    wherein the night vision device is mounted onto a weapon for use as a day/night sight.

2. The night vision device according to claim 1, further comprising a mode selection mechanism housing the image intensifying sensor/display combination and the daytime optical path length compensator, the mode selection mechanism being structured to selectively place either the image intensifying sensor/display combinations or the daytime optical path length compensator.

3. The night vision device according to claim 1, further comprising at least one guide rail, and wherein the slider includes at least one slide rail structured to guide the slider along the guide rail.

4. The night vision device according to claim 3, wherein the at least one guide rail comprises a first guide rail and a second guide rail, and wherein the at least one slide rail comprises a first slide rail and a second slide rail.

5. The night vision device according to claim 3, further comprising a row of teeth substantially parallel to the at least one guide rail.

6. The night vision device according to claim 5, further comprising:
    a gear coupled to a shaft rotatably secured within a housing of the night vision device;
    a handle disposed outside the housing and secured to the shaft; and
    wherein the row of teeth is structured to mesh with the gear.

7. The night vision device according to claim 1, wherein the image intensifying sensor/display combination comprises a glass-input glass-output image intensifier having planar input and output surfaces, and wherein the combination of the image intensifying sensor/display combination and the slider requires no change in focus after switching between the day position and the night position.

8. The night vision device according to claim 1, further comprising a beam splitter structured to direct a portion of incoming light to an electro-optical module including a camera structured to permit a person to view an image as viewed by a shooter.

9. The night vision device according to claim 1, further comprising a coaxial objective lens.

10. The night vision device according to claim 9, wherein the coaxial objective lens has a central portion and an annular portion, one of the central portion and annular portion being structured to transmit visible light, and the other of the central portion and the annular portion being structured to transmit light having a wavelength separate from visible light.

11. The night vision device according to claim 1, further comprising:
    a zoom eyepiece structured to magnify an image presented to a user through the night vision device; and
    an aiming reticle selected from the group consisting of etched glass, wire, deposited metal, and holographic projected design.

12. The night vision device according to claim 11, further comprising means for moving the reticle with respect to an image displayed by the night vision device.

13. The night vision device according to claim 1, further comprising an image erector assembly disposed after the image intensifying sensor/display combination or the daytime optical path length compensator.

14. The night vision device according to claim 1, further comprising an elastomer disposed between the image intensifying sensor/display combination and the slider.

15. The night vision device according to claim 1, wherein the image intensifying sensor/display combination comprises a glass-input glass-output image intensifier having planar input and output surfaces.

16. The night vision device according to claim 15 wherein the glass plate has substantially the same optical path length as the glass-input glass-output image intensifier.

17. The night vision device according to claim 15 wherein the glass plate has substantially the same thickness and refractive index as the glass-input glass-output image intensifier.

18. The night vision device according to claim 15 wherein the glass plate has a thickness and refractive index different from the glass-input glass-output image intensifier.

19. A night vision device, comprising:
    an optical path defined within the night vision device;
    an image intensifying sensor/display combination having an optical path length;
    a daytime optical path length compensator including a glass plate having planar input and output surfaces and having an optical path length substantially the same as the optical path length of the image intensifying sensor/display combination; and
    a slider having at least one slide rail structured to guide the slider along at least one guide rail and for laterally sliding either the image intensifying sensor/display combination or the daytime optical path length compensator within the optical path.

20. The night vision device according to claim 19, wherein the at least one guide rail comprises a first guide rail and a second guide rail, and wherein the at least one slide rail comprises a first slide rail and a second slide rail.

21. The night vision device according to claim 20, further comprising a row of teeth substantially parallel to the first and second guide rails.

22. The night vision device according to claim 21, further comprising:
    a gear coupled to a shaft rotatably secured within a housing of the night vision device;
    a handle disposed outside the housing and secured to the shaft; and
    wherein the row of teeth is structured to mesh with the gear.

* * * * *